UNITED STATES PATENT OFFICE.

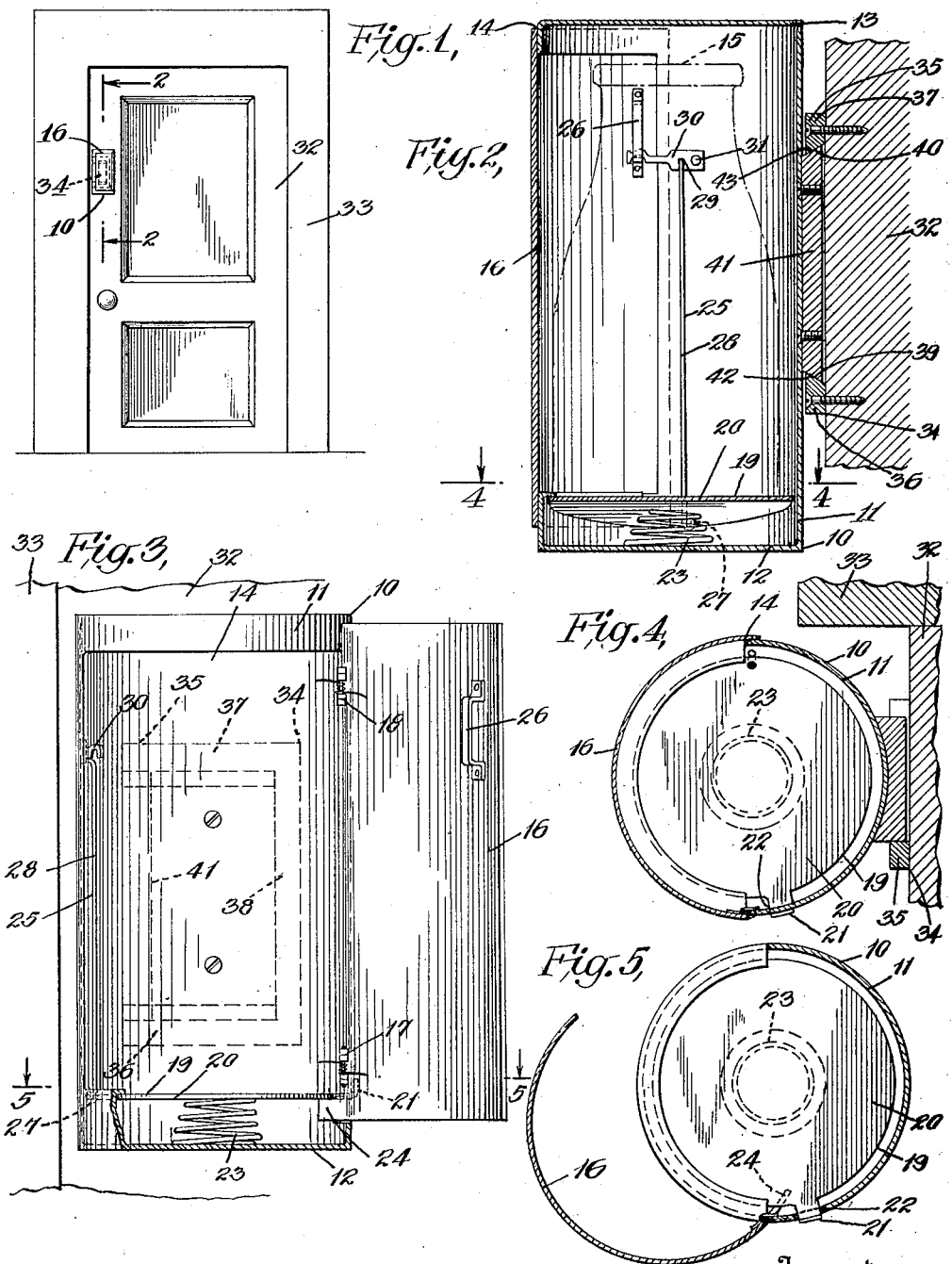

ROCCO LOZZITTO AND LOUIS MOSS, OF NEW YORK, N. Y.

BOTTLE-HOLDER.

1,346,901.                    Specification of Letters Patent.       Patented July 20, 1920.

Application filed July 11, 1918. Serial No. 244,393.

*To all whom it may concern:*

Be it known that we, ROCCO LOZZITTO and LOUIS MOSS, a subject of the King of Italy and a citizen of the United States, respectively, and both residing at New York, borough of Bronx, in the county of Bronx and State of New York, have invented a certain new and useful Improvement in Bottle-Holders, of which the following is a full, clear, and exact specification.

This invention relates more particularly to a class of devices adapted to safely keep articles when delivered to homes.

Our invention has for its object primarily to provide a holder designed to be employed for permitting articles, such as bottles of milk and other food products, to be safely kept against being surreptitiously taken when delivered to homes in order to avoid the necessity of the occupants being required to personally receive the articles, and this is accomplished mainly by providing a casing with a normally open door whereby the article may be placed in the casing. Interiorly of the casing is a cushion on which the article is received, and this cushion is adapted to yieldingly move upwardly and downwardly in the casing. Within the casing is a catch which is operable by the movement of the cushion when compressed by the pressure of the weight of the article placed thereon for releasably locking the door when closed to prevent the casing from being surreptitiously opened.

Other objects of the invention are to provide means for detachably fastening the casing on the outside of the door of a building in a manner whereby the casing will be held against removal until the door is opened; and to provide a holder of a simple and efficient construction which may be made in any desired size and shape.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawing, Figure 1 is an elevation of the door of a building showing the manner of using one form of bottle holder embodying our invention in conjunction therewith.

Fig. 2 is an enlarged fragmentary view showing a detail section taken on the line 2—2 of Fig. 1.

Fig. 3 is an enlarged fragmentary view, showing an elevation, partly broken away, of the holder with its door in an open position.

Fig. 4 is a fragmentary sectional view, partly in detail, taken on the line 4—4 of Fig. 2, and Fig. 5 is a detail sectional view taken on the line 5—5 of Fig. 3 which shows the door of the holder partly closed.

The device or holder has a casing 10 which may be of any desired shape and size as well as being made of any suitable material, though the form of the casing illustrated has a cylindrical wall 11 with a bottom 12 and a top 13. In the wall 11 of the casing is an opening 14 to allow an article such as a bottle of milk, as 15, to be admitted into the casing, and this opening is adapted to be closed by a door 16 which is hinged, at 17 and 18, to the casing so as to be swung to open and closed positions, these hinges being spring actuated, as shown, to normally hold the door in an open position.

Interiorly of the casing at its bottom part is a cushion or false bottom 19 on which the article is placed when passed through the opening 14 of the casing for yieldingly compressing the cushion. This cushion is preferably composed of a circular plate 20 of less diameter than the interior of the casing, and this plate is arranged some distance above the bottom 12 of the casing. Projecting from part of the edge of the plate 20 is a lug 21 which is movably disposed through an opening 22 provided in the wall of the casing opposite to the lower part of the door 16 of the casing to pivot the plate to the casing so that the remainder of the plate may move upwardly and downwardly in the casing. Between the plate 20 and the bottom 12 of the casing is a spiral or coil spring 23, and this spring is tensioned to normally force the plate upwardly in the casing, besides normally supporting the plate on a level with the lower marginal edge of the opening 14 of the casing. The weight of a bottle of milk or other article when placed in the casing 10 on the plate 20 will cause this plate to be lowered in the casing against the tension of the spring 23, and to prevent the plate from being thus moved downwardly until the door is closed, projecting laterally from the lower corner of the hinged edge of the door is a lug 24 which extends interiorly of the casing through its opening 14, and on this lug rests the plate 20 of the cushion 19 while the door 16 remains open. This lug is also arranged so that when the door is closed the lug will be freed from engagement with the plate 20 to allow the plate to be moved downwardly in the casing by the pressure of the weight of the article placed thereon.

In order to releasably lock the door 16 when closed to prevent the contents of the casing from being surreptitiously removed, we provide a catch, as 25. This catch preferably consists of a strap or angular bar, as 26, which protrudes from the upper end of the inside of the door adjacent to its free lengthwise edge and to part of the plate 20 of the cushion 19 which is in proximity to the opening 14 of the casing 10 is held, at 27, the lower end of a rod 28 extending upwardly in the casing. The rod 28 is of a length so that its second end terminates slightly above the lower end of the strap 26 provided on the door of the casing, and this second end of the rod is pivotally connected, at 29, to the central part of a clip or hook 30. One end of the hook 30 is pivoted, at 31, interiorly of the casing 10, and this hook is arranged so that its second end will be disposed in the strap 26 for engaging the lower end of the strap when the door is closed on the casing. Thus following the placing of an article in the casing 10 on the plate 20 of the cushion 19 and following the closing of the door 16 the weight of the article will cause the plate to move downwardly against the tension of the spring 23. This movement of the spring actuated plate 23 will likewise cause the rod 28 to move downwardly in the casing, and the hook 30 will then be swung into engagement with the strap 26 on the door of the casing to releasably lock the door against being surreptitiously opened.

The holder is designed for being preferably used on the exterior of the part of the door, as 32, of a building which is in proximity to the frame, as 33, so that the frame of the door may serve for efficient operation of the device. To accomplish this the casing is detachably applied on the door by means of a lock, as 34. The lock 34 is preferably composed of a substantially U-shaped plate or bar 35 to provide two spaced parallel arms 36 and 37 and an arm 38 which bridges one end of the parallel arms. This bar is bolted or otherwise fastened on part of the door of a building so that the free ends of its arms 36 and 37 are adjacent to the part of the door frame in proximity to the usual lock of the door, and the opposed edges of these parallel arms of the U-shaped bar are lengthwise beveled respectively in upwardly and downwardly directions toward the door. These beveled parts thereby provide grooves 39 and 40 in the opposed edges of the arms 36 and 37 of the U-shaped bar of the lock 34. On part of the wall 11 of the casing 10 which is opposite to the door 16 is a block 41 which may be of a thickness somewhat greater than the depth of the grooves 39 and 40 of the U-shaped bar 35, and the extreme length of this block is slightly less than the extreme distance of the space between the beveled grooves of the U-shaped bar. The lower end of the block 41 is beveled upwardly, as at 42, toward the casing 10, while the upper end of the block is beveled downwardly, as at 43, also toward the casing 10, and by forcing this block and the U-shaped bar 35 in this manner the block is adapted to be slidably guided in the grooves 39 and 40 of the bar 35.

In practice the device is employed by allowing the door 16 of the casing 10 to swing to an open position. The casing 10 is removably applied to the door 32 of the building, following the opening of this door, by slidably fitting the block 41 so that its beveled edges 42 and 43 will be disposed in the grooves 39 and 40 of the U-shaped bar 35 of the lock 34. The door of the building is then to be closed, and the casing will be arranged in proximity to the frame of the door so as to prevent the casing from being removed from the door until the door is opened as the frames of the doors of buildings usually protrude beyond the door. When an article is delivered it is placed on the plate 20 of the cushion 19 in the casing 10, and by swinging the door 16 to closed position on the casing the catch 25 will be operated, as above explained, to releasably lock the door for preventing surreptitious removal of the article from the casing. In order to remove the article from the casing the door of the building is opened, and the casing 10 is detached from the door by slidably guiding the block 41 from the bar 35 of the lock 34. The casing is then tilted so that the article will move on the plate 20 toward its lug 21, and the tension of the spring 23 will cause the other part of the plate 20 to be swung upwardly, and in turn the hook 30 of the catch 25 will be released from its engagement with the strap 26 of the catch. The door 16 of the device will then swing open to allow the article to be removed from the casing.

In the foregoing description we have embodied the preferred form of our invention, but we do not wish to be understood as limiting ourselves thereto, as we are aware that modifications may be made therein without departing from the principle or sacrificing any of the advantages of this invention, therefore we reserve to ourselves the right to make such changes as fairly fall within the scope thereof.

Having thus described our invention, we claim as new and desire to secure by Letters Patent:—

1. A holder of the class described including a casing having a swinging door, a false bottom mounted for vertical tilting movement adjacent the bottom of said casing, means constructed and arranged to be brought into operation by the downward tilting of the false bottom when an article is placed thereon for locking said door when the latter is closed, and automatic means to prevent the downward tilting of the false bottom when the door is open and to permit such tilting when the door is closed.

2. A holder of the class described including a casing having a swinging door, a false bottom mounted for vertical tilting movement adjacent the bottom of said casing, means constructed and arranged to be brought into operation by the downward tilting of the false bottom when an article is placed thereon for locking said door when the latter is closed, automatic means to prevent the downward tilting of the false bottom when the door is open and to permit such tilting when the door is closed, yieldable means to raise said false bottom and unlock the door when the casing and the article contained thereby are tilted in one direction, and yieldable means to open the door when said casing and the article are so tilted.

This specification signed and witnessed this 10th day of July, A. D. 1918.

ROCCO LOZZITTO.
LOUIS MOSS.

Witnesses:
E. W. JONES,
L. CASANO.